US008457115B2

(12) United States Patent
Zhan et al.

(10) Patent No.: US 8,457,115 B2
(45) Date of Patent: Jun. 4, 2013

(54) METHOD AND APPARATUS FOR CONCEALING LOST FRAME

(75) Inventors: Wuzhou Zhan, Shenzhen (CN); Dongqi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 434 days.

(21) Appl. No.: 12/913,245

(22) Filed: Oct. 27, 2010

(65) Prior Publication Data

US 2011/0044323 A1 Feb. 24, 2011

Related U.S. Application Data

(63) Continuation of application No. PCT/CN2009/070438, filed on Feb. 16, 2009.

(30) Foreign Application Priority Data

May 22, 2008 (CN) .......................... 2008 1 0028223

(51) Int. Cl.
*H04L 12/66* (2006.01)

(52) U.S. Cl.
USPC ........... 370/352; 370/356; 370/353; 370/208; 704/403; 704/268; 704/219; 704/229; 704/203

(58) Field of Classification Search
USPC .................. 370/352–356, 208; 704/403, 268, 704/201, 229, 228, 219, 203
See application file for complete search history.

(56) References Cited

U.S. PATENT DOCUMENTS 6,351,730 B2 2/2002 Chen
2002/0133764 A1* 9/2002 Wang ............................ 714/707
2004/0010407 A1* 1/2004 Kovesi et al. ................. 704/219
2004/0024588 A1 2/2004 Watson et al.
2004/0250195 A1* 12/2004 Toriumi ........................ 714/758
2007/0094009 A1* 4/2007 Ryu et al. ................... 704/200.1

(Continued)

FOREIGN PATENT DOCUMENTS

CN 1901431 1/2007
CN 101071568 11/2007

(Continued)

OTHER PUBLICATIONS

Korean Office Action dated Nov. 28, 2011 issued in corresponding Korean Patent Application No. 10-2010-7024576.

(Continued)

*Primary Examiner* — Asad Nawaz
*Assistant Examiner* — Khaled Kassim
(74) *Attorney, Agent, or Firm* — Staas & Halsey LLP

(57) ABSTRACT

A method for concealing lost frame includes: using history signals before the lost frame that corresponds to a lost MDCT coefficient to generate a first synthesized signal when it is detected that the MDCT coefficient is lost; performing fast IMDCT for the first synthesized signal to obtain an IMDCT coefficient corresponding to a lost MDCT coefficient; and using the IMDCT coefficient corresponding to the lost MDCT coefficient and an IMDCT coefficient adjacent to the IMDCT coefficient corresponding to the lost MDCT coefficient to perform TDAC and obtain signals corresponding to the lost frame. An apparatus for concealing lost frame is also disclosed herein. The method and the apparatus for concealing lost frames in the embodiments of the present invention make full use of the received partial signals to recover high-quality voice signals and improve the QoS.

2 Claims, 8 Drawing Sheets

U.S. PATENT DOCUMENTS

| | | | | |
|---|---|---|---|---|
| 2007/0118369 | A1 | 5/2007 | Chen | |
| 2007/0150262 | A1 | 6/2007 | Mori et al. | |
| 2007/0271101 | A1 * | 11/2007 | Sato et al. | 704/268 |
| 2010/0100390 | A1 | 4/2010 | Tanaka | |

FOREIGN PATENT DOCUMENTS

| | | |
|---|---|---|
| CN | 101166071 | 4/2008 |
| JP | 7334191 | 12/1995 |
| JP | 2002-244685 | 8/2002 |
| JP | 2004506947 | 3/2004 |
| JP | 2004-252109 | 9/2004 |
| JP | 2005-266458 | 9/2005 |
| JP | 2005-338200 | 12/2005 |
| WO | 2005/109402 | 11/2005 |
| WO | 2006/137425 | 12/2006 |
| WO | 2007/051124 | 5/2007 |

OTHER PUBLICATIONS

*Pulse Code Modulation (PCM) of Voice Frequencies, G.711 Appdendix I* (Sep. 1999); *A High Quality Low-Complexity Algorithm for Packet Loss Concealment with G.711*, ITU-T, Sep. 1999, (25 pp.).

Written Opinion of the International Searching Authority, mailed May 28, 2009, in corresponding International Application No. PCT/CN2009/070438 (3 pp.).

Extended European Search Report, mailed Apr. 15, 2011, in corresponding European Application No. 09749413.2 (7 pp.).

Ogg Vorbis, University of Electronic Science and Technology of China, 200320104050, pp. 1-72.

Communication under Rule 71(3) EPC about intention to grant European Patent in corresponding European patent application No. 097494132.2, dated Dec. 27, 2011 (39 pages).

Office Action, mailed Jun. 24, 2011, in Chinese Application No. 200810028223.3 (9 pp.).

*ITU-T G.711 Appendix I: A high quality low-complexity algorithm for packet loss concealment with G.711*, Sep. 1999 (24 pp.).

Ofir, H. et al., *Audio Packet Loss Concealment in a Combined MDCT-MDST Domain*, IEEE Signal Processing Letters, vol. 14, No. 12, Dec. 2007, pp. 1032-1035.

Princen, J. et al., *Analysis/Synthesis Filter Bank Design Based on Time Domain Aliasing Cancellation*, IEEE Transactions on Acoustics, Speech, and Signal Processing, vol. ASSP-34, No. 5, Oct. 1986, pp. 1153-1161.

Wang, Y. et al., *On the Relationship Between MDCT, SDFT and DFT*, Submitted to the 5th International Conference on Signal Processing (ICSP2000), Aug. 21-25, 2000, Beijing, China (4 pp.).

Wang, Y. et al., *Restructured Audio Encoder for Improved Computational Efficiency*, Presented at the 108th Convention of the Audio Engineering Society, Feb. 19-22, 2000, Paris, France, pp. 1-10.

International Search Report, mailed May 28, 2009, in corresponding International Application No. PCT/CN2009/070438 (6 pp.).

Omuro, Chuta, "Bursty Packet Disappearance as a result of Conservation Speech Feature Preservation," The Acoustic Society of Japan, Collection of Papers I on Autumn 2004 Workshop, Sep. 2004, pp. 299-300 (3 pages).

Japanese Office Action issued Sep. 4, 2012 in corresponding Japanese Patent Application No. 2011-509843 (2 pages) (2 pages English translation).

* cited by examiner

METHOD AND APPARATUS FOR CONCEALING LOST FRAME

CROSS-REFERENCE TO RELATED APPLICATIONS

This application is a continuation of International Application No. PCT/CN2009/070438, filed on Feb. 16, 2009, which claims priority to Chinese Patent Application No. 200810028223.3, filed on May 22, 2008, both of which are hereby incorporated by reference in their entireties.

FIELD OF THE INVENTION

The present invention relates to the telecommunications field, and in particular, to a method and an apparatus for concealing lost frame.

BACKGROUND OF THE INVENTION

With development of network technologies, more applications are put forward that transmit voice packets through a packet switching network and perform real-time voice communication, for example, Voice over IP (VoIP). However, the network based on the packet switching technology is not initially designed for the applications that require real-time communication, and is not absolutely reliable. In the transmission process, data packets may be lost; or, if they arrive at the receiver beyond the time of playing, they are discarded by the receiver, which are both considered as packet loss. Packet loss is a huge problem to real-time requirement and the voice quality required by the VoIP. The VoIP receiver is responsible for decoding the voice packets sent by the sender into playable voice signals. If any packet is lost and no compensation is made, the voice signals are not continuous, and noise occurs, which affects voice quality. Therefore, a robust solution to concealing lost packets is required in a real-time communication system to recover the lost packets, and ensure communication quality in the case that some packets are lost in the network.

Currently, the common technology of concealing lost packets is based on pitch repetition. For example, the solution to concealing lost packets in Appendix I to voice compression standard G.711 formulated by ITU employs is based on pitch waveform substitution. Pitch waveform substitution compensates for the lost audio frames based on the receiver. The history signals that exist before the lost frame are used to calculate the pitch period $T_0$ of the history signals, and then a segment of signals that exist before the lost frame are copied repeatedly to reconstruct the signals corresponding to the lost frame, where the length of the segment is $T_0$. As shown in FIG. 1, frame 2 is a lost frame, frame length is N, and frame 1 and frame 3 are complete frames. It is assumed that the pitch period corresponding to the history signals (signals of frame 1 and those before frame 1) is $T_0$, and the interval corresponding to the signals is interval 1. The signals corresponding to the last pitch period of the history signals (namely, signals corresponding to interval 1) may be copied to frame 2 repeatedly until frame 2 is full in order to reconstruct the signals corresponding to the lost frame. In FIG. 1, the signals of two pitch periods need to be copied repeatedly to fill the lost frame.

However, if the signals of the last pitch in the history signals are repeatedly used directly as the signals corresponding to the lost frame, waveform mutation occurs at the joint of the two pitches. To ensure smoothness of the joint, the signals in last $T_0/4$ of the history buffer generally undergo cross attenuation before the signals of the last pitch period in the history buffer are used to fill the lost frame. As shown in FIG. 2, the applied window is a simple triangular window. The rising window corresponds to the dashed line with an upward gradient in FIG. 2, and the falling window corresponds to the dashed line with a downward gradient in FIG. 2. The $T_0/4$ signals prior to the last pitch period $T_0$ in the history buffer are multiplied by the rising window. The last $T_0/4$ signals in the buffer are multiplied by the falling window and overlapped. Then, the multiplied signals replace the last $T_0/4$ signals of the history buffer to ensure smooth transition at the joint of two adjacent pitches at the time of pitch repetition.

In voice communication, when Discrete Cosine Transform (DCT) is applied to broadband audio coding, because the shock response of the bandpass filter is a finite length, a block boundary effect occurs, and great noise occurs. Such defects are overcome by Modified Discrete Cosine Transform (MDCT).

MDCT uses Time Domain Aliasing Cancellation (TDAC) to reduce the boundary effect. To obtain an MDCT coefficient composed of 2N sample signals, for an input sequence x[n], the MDCT uses N samples of this frame and N samples of an adjacent signal frame before the frame to constitute a sequence of 2N samples, and then defines a window function of 2N samples to be h[n], which fulfills:

$$h[n]^2+h[n+N]^2=1 \tag{1}$$

For example, h[n] may be defined simply as a sine window:

$$h[n]=\sin\left(\frac{n}{2N}\pi\right) \tag{2}$$

which leads to 50% overlap of the data between the windows. The MDCT coefficient of x[n] is X[k], and the Inverse Modified Discrete Cosine Transform (IMDCT) coefficient of x[n] is Y[n], which are separately defined as:

$$X[k]=\sum_{n=0}^{2N-1} x[n]\cdot h[n]\cdot\cos\left[\frac{(2k+1)\pi}{2N}\cdot(n+n_0)\right] \tag{3}$$

$$Y[n]=\frac{2}{N}\cdot\sum_{k=0}^{N-1} X[k]\cdot\cos\left[\frac{(2k+1)\pi}{2N}\cdot(n+n_0)\right] \tag{4}$$

In the formulas above, $$k=0,\ldots,N-1,\ n=0,\ldots,2N-1,\ n_0=\frac{N+1}{2}.$$

Therefore, the reconstructed signal y[n] may be obtained from TDAC for Y[n] and Y'[n] based on the following formula:

$$y[n]=h[n+N]\cdot Y'[n+N]+h[n]\cdot Y[n]\quad n=0,\ldots,N-1, \tag{5}$$

In the formula above, Y'[n] represents an IMDCT coefficient that is prior to and adjacent to Y[n].

On the encoder side, the encoder performs MDCT for the original voice signal according to formula (3) to obtain X[k], encodes X[k] and sends it to the decoder side. On the decoder side, after receiving the MDCT coefficient from the encoder, the decoder performs IMDCT for the received X[k] according to formula (4) to obtain Y[n], namely, IMDCT coefficient corresponding to X[k].

For brevity of description, it is assumed that the IMDCT coefficient obtained after the decoder performs IMDCT for the currently received X[k] is Y[n], n=0, . . . , 2N−1, and the IMDCT coefficient prior to and adjacent to Y[n] is Y'[n], n=0, . . . , 2N−1. Taking FIG. 3 as an example, based on the foregoing assumption, the IMDCT coefficient corresponding to frame F0 and frame F1 is IMDCT1, expressed as Y'[n], n=0, . . . , 2N−1; the IMDCT coefficient corresponding to frame F1 and F2 is IMDCT2, expressed as Y[n], n=0, . . . , 2N−1. On the decoder side, the decoder substitutes Y[n], n=0, . . . , 2N−1 and Y'[n], n=0, . . . , 2N−1 into formula (5) to obtain the reconstructed signal y[n].

When an MDCT coefficient is lost, as shown in FIG. 4, the decoder receives MDCT3 corresponding to frame F2 and frame F3 and MDCT5 corresponding to frame F4 and frame F5, but fails to receive MDCT4 corresponding to frame F3 and frame F4. Consequently, the decoder fails to obtain IMDCT4 according to formula (4). The decoder receives only the part of coefficient corresponding to F3 in IMDCT3 and the part of coefficient corresponding to F4 in IMDCT5, and is unable to recover the signals corresponding to frame F3 and frame F4 completely by using IMDCT3 and IMDCT5 alone.

In the process of developing the present invention, the inventor finds that: The prior art needs to use the decoded signals of frame F2 and frames prior to F2 to generate signals of the lost frame, and completely discard the part of coefficient corresponding to F3 in the received IMDCT3 and the part of coefficient corresponding to the frame F4 in the received IMDCT5. According to definition of MDCT/IMDCT in formula (3) and formula (4), the part of coefficient corresponding to frame F3 in the received IMDCT3 and the part of coefficient corresponding to frame F4 in the received IMDCT5 include useful information in light of formula (5). Moreover, supposing that the frame length is N samples, once n MDCT coefficients are lost continuously, the number of samples corresponding to the affected signals is (n+1)*N. With more MDCT coefficients being lost, the quality of the recovered signals is worse, the user experience is worse, and the Quality of Service (QoS) is deteriorated.

SUMMARY OF THE INVENTION

The embodiments of the present invention provide a method and an apparatus for concealing lost frame to make full use of the received partial signals to recover high-quality voice signals and thus to improve the QoS.

One aspect of the present invention is to provide a method for concealing a lost frame. The method includes:

using history signals before the lost frame that corresponds to a lost MDCT coefficient to generate a first synthesized signal when it is detected that the MDCT coefficient is lost;

performing fast IMDCT for the first synthesized signal to obtain an IMDCT coefficient corresponding to a lost MDCT coefficient; and using the IMDCT coefficient corresponding to the lost MDCT coefficient and an IMDCT coefficient adjacent to the IMDCT coefficient corresponding to the lost MDCT coefficient to perform TDAC and obtain signals corresponding to the lost frame.

Another aspect of the present invention is to provide an apparatus for concealing a lost frame. The apparatus includes:

a synthesized signal generating module, configured to use history signals before the lost frame that corresponds to a lost Modified Discrete Cosine Transform (MDCT) coefficient to generate a first synthesized signal when it is detected that the MDCT coefficient is lost;

a fast Inverse Modified Discrete Cosine Transform (IMDCT) calculating module, configured to perform fast IMDCT for the first synthesized signal to obtain an IMDCT coefficient corresponding to the lost MDCT coefficient; and a Time Domain Aliasing Cancellation (TDAC) module, configured to use the IMDCT coefficient calculated out by the fast IMDCT calculating module and an IMDCT coefficient adjacent to the calculated IMDCT coefficient to perform TDAC and obtain signals corresponding to the lost frame.

Another aspect of the present invention is to provide a system for concealing a lost frame, comprising an apparatus for concealing a lost frame, the apparatus for concealing a lost frame comprises:

a synthesized signal generating module, configured to use history signals before the lost frame that corresponds to a lost Modified Discrete Cosine Transform (MDCT) coefficient to generate a first synthesized signal when it is detected that the MDCT coefficient is lost;

a fast Inverse Modified Discrete Cosine Transform (IMDCT) calculating module, configured to perform fast IMDCT for the first synthesized signal to obtain an IMDCT coefficient corresponding to the lost MDCT coefficient; and a Time Domain Aliasing Cancellation (TDAC) module, configured to use the IMDCT coefficient calculated out by the fast IMDCT calculating module and an IMDCT coefficient adjacent to the calculated IMDCT coefficient to perform TDAC and obtain signals corresponding to the lost frame.

The method and the apparatus for concealing lost frames in the embodiments of the present invention make full use of the received partial signals to recover high-quality voice signals and thus to improve the QoS.

DETAILED DESCRIPTION OF THE EMBODIMENTS

The method and the apparatus for concealing lost frame are elaborated below with reference to accompanying drawings.

Figure 1:
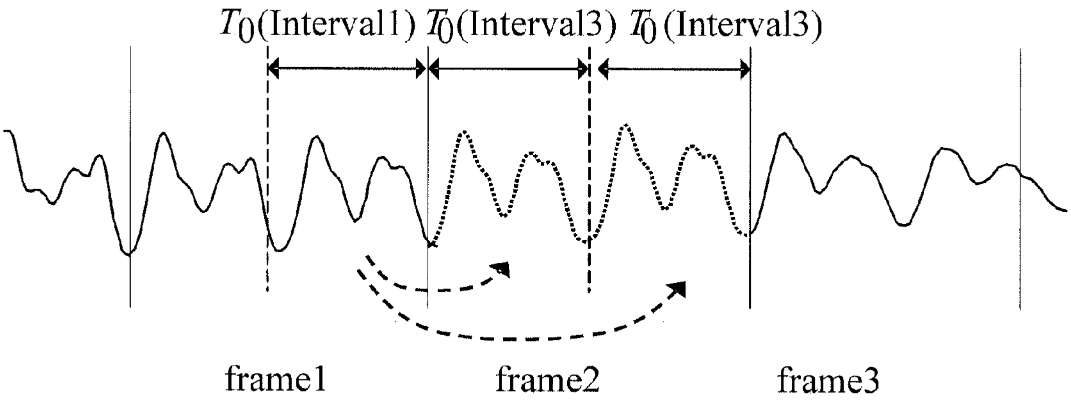
FIG. 1 shows signal filling with a lost packet concealing technology based on pitch repetition in the prior art.
Figure 2:
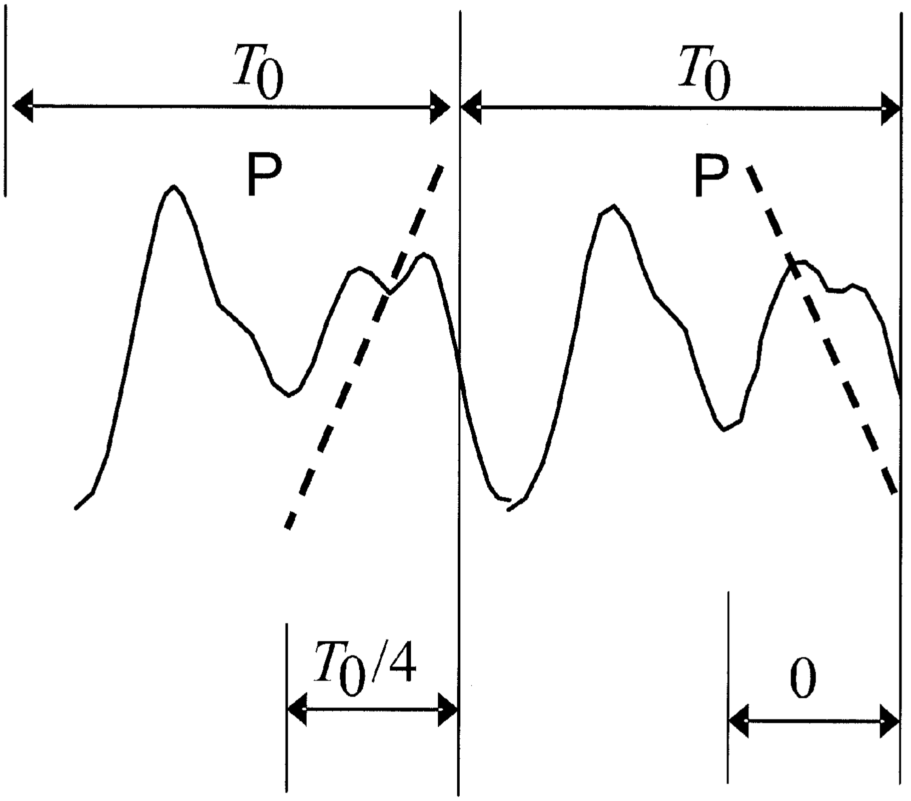
FIG. 2 shows smoothening of signals in a pitch buffer in the prior art.
Figure 3:
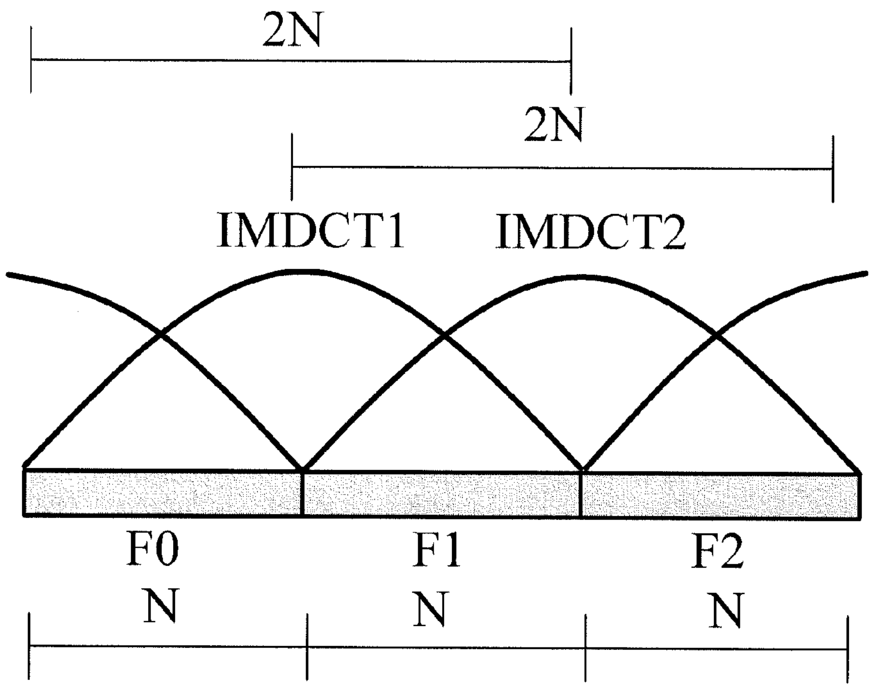
FIG. 3 shows mapping relation between an MDCT/IMDCT coefficient and a signal frame in the prior art.
Figure 4:
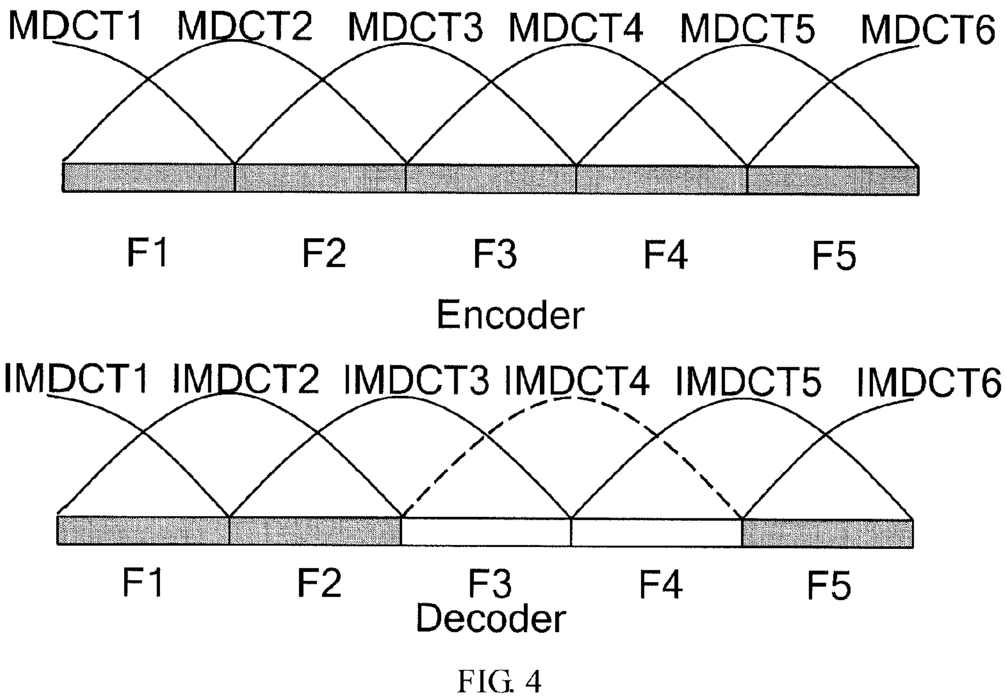
FIG. 4 shows contrast between signals sent by the encoder and signals received and decoded by the decoder after packets are lost in the prior art.
Figure 5:
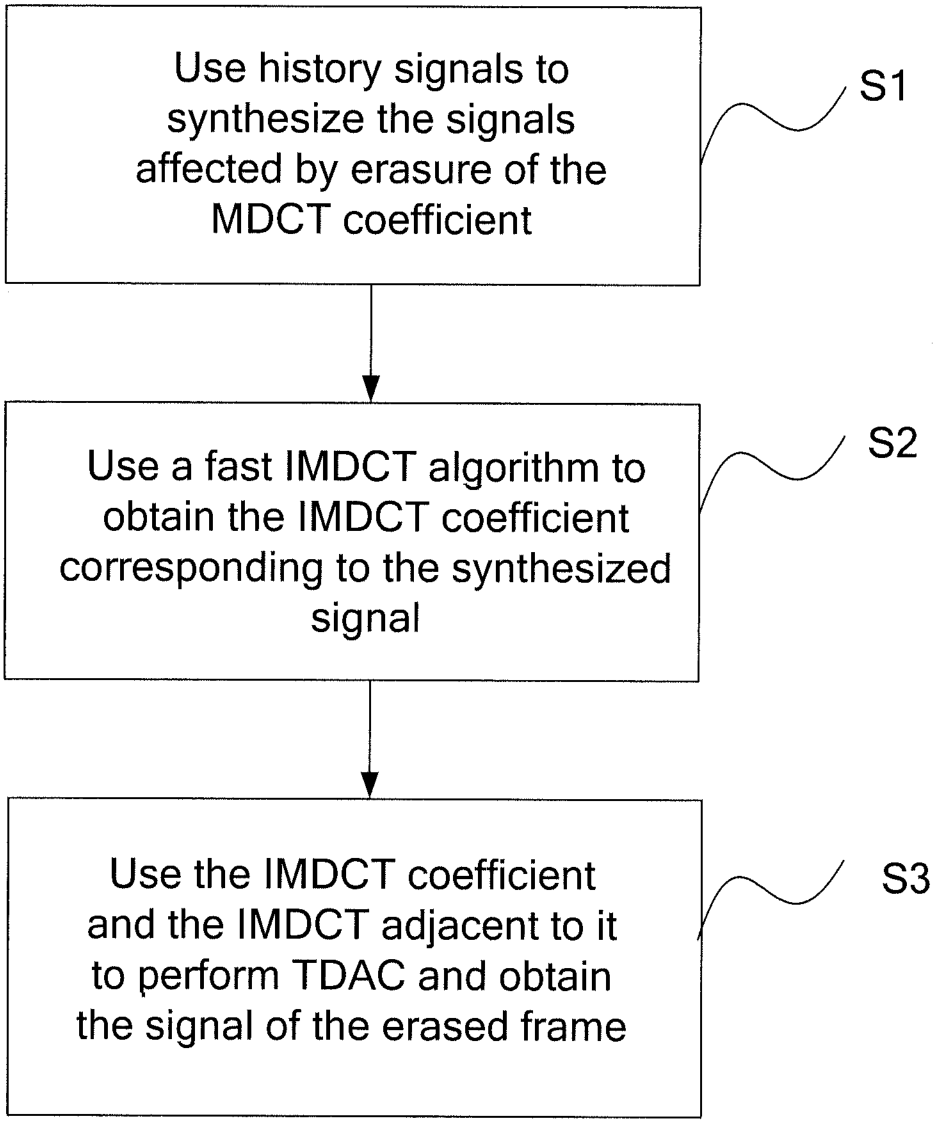
FIG. 5 is a flowchart of a method for concealing lost frames in an embodiment of the present invention.

FIG. 5 is a flowchart of a method for concealing lost frames in an embodiment of the present invention. As shown in FIG. 4, the decoder receives an MDCT coefficient MDCT3 corresponding to frame F2 and frame F3 and MDCT5 corresponding to frame F4 and frame F5, but fails to receive MDCT4 corresponding to frame F3 and frame F4. Therefore, the decoder performs the following blocks:

S1. When the decoder detects that the MDCT coefficient is lost, the history signals before lost frames that correspond to the MDCT coefficient are used to generate a first synthesized signal. In this embodiment, the lost frames corresponding to MDCT4 are frame F3 and frame F4, and the history signals are the frame F2 and frames prior to F2.

S2. A fast IMDCT algorithm is used to perform fast IMDCT for the first synthesized signal to obtain an IMDCT coefficient corresponding to the lost MDCT coefficient.

S3. The IMDCT coefficient corresponding to the lost MDCT coefficient and an IMDCT coefficient adjacent to the IMDCT coefficient corresponding to the lost MDCT coefficient are used to perform TDAC and signals corresponding to the lost frames that correspond to the lost MDCT coefficient are obtained.

Figure 6:
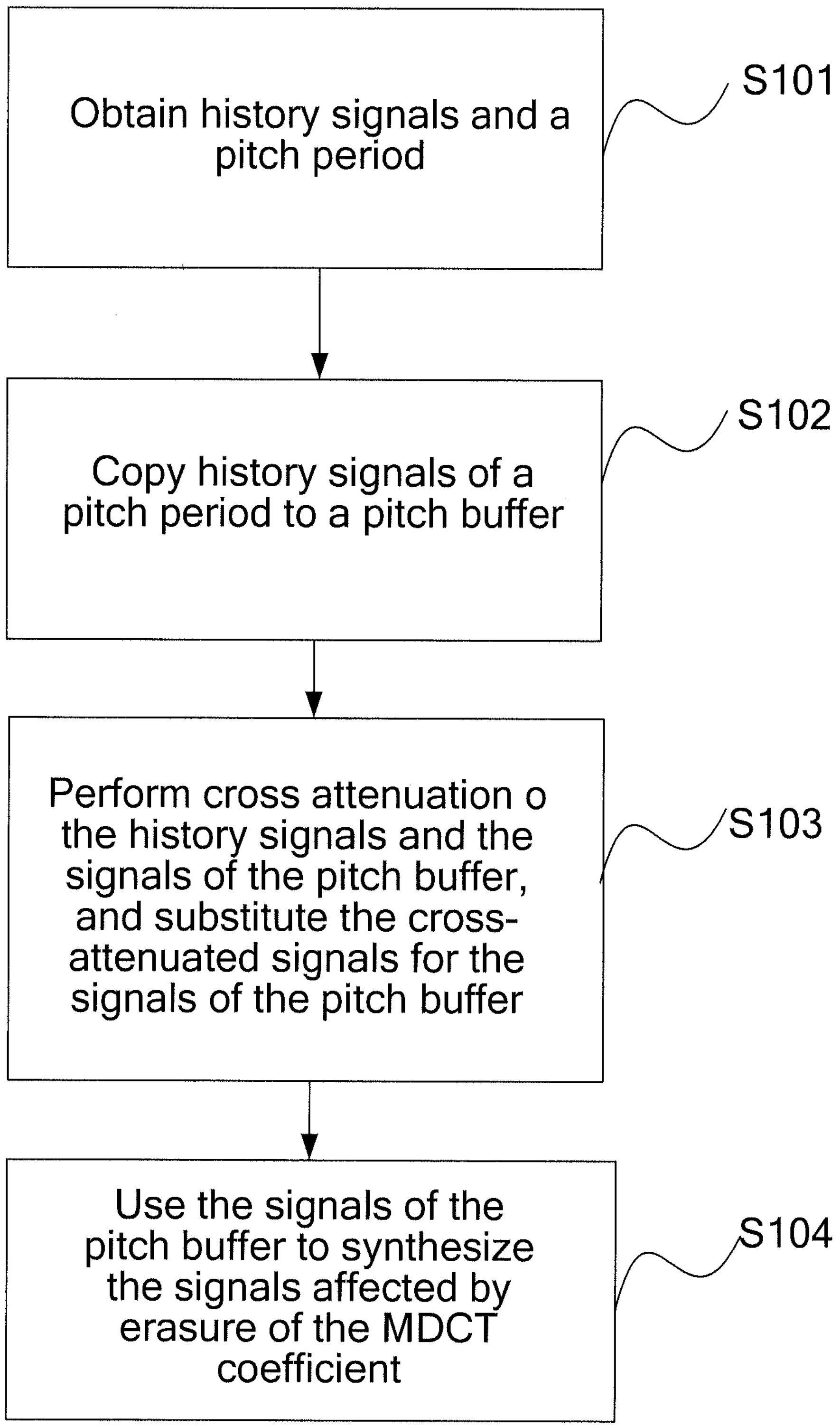
FIG. 6 is a detailed flowchart of block S1 illustrated in FIG. 5.
Figure 7:
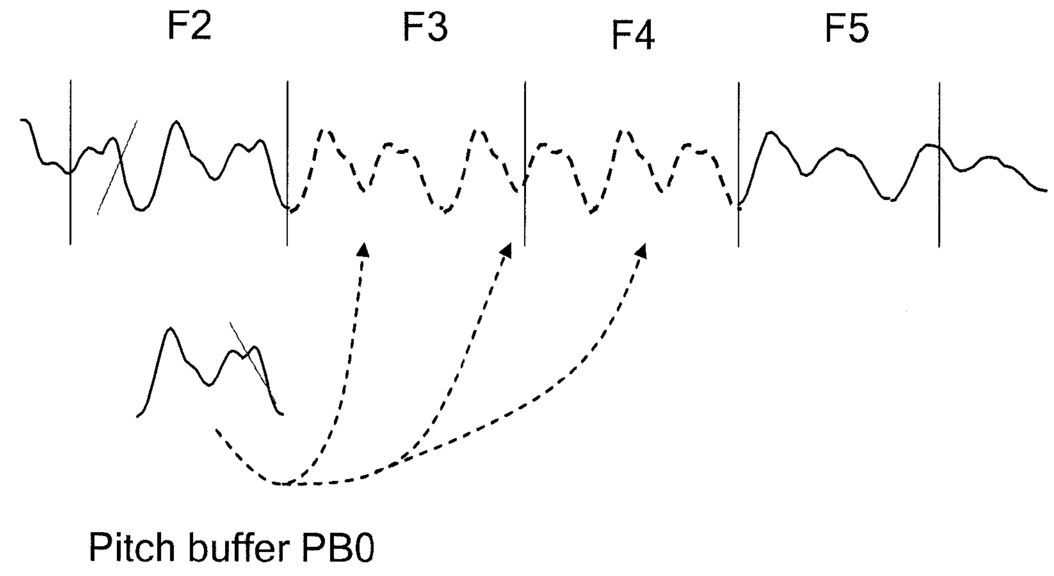
FIG. 7 shows how to generate a first synthesized signal based on pitch repetition in an embodiment of the present invention.

In practice, as shown in FIG. 6, in light of FIG. 4 and FIG. 7, the history signals before the lost frame that corresponds to the MDCT coefficient are used to generate the first synthesized signal in block S1 includes the following detailed blocks:

S101. The pitch period $T_0$ that correspond to the history signals existing before the lost frame is obtained.

S102. The last $T_0$ length signal of the history signals is copied to the pitch buffer $PB_0$.

S103. The signal that begins at the last $5T_0/4$ of the history signals and whose length is $T_0/4$ is multiplied by a rising window to obtain a first multiplied signal, and the signal that begins at $3T_0/4$ in the pitch buffer and whose length is $T_0/4$ is multiplied by a falling window to obtain a second multiplied signal, and cross attenuation is performed on the first multiplied signal and the second multiplied signal. The signal that begins at $3T_0/4$ in the pitch buffer and whose length is $T_0/4$ is substituted by the cross-attenuated signal.

Here it is not necessary to update the last $T_0/4$ signals of the history signals because frame F3 still has partial valid signals. And the partial signals at the end of the lost frame are approximate to the original signals. It is not necessary to perform cross attenuation on the end of the history signals according to the nature of aliasing cancellation.

S104. The signals whose length is $T_0$ in the pitch buffer are used to generate the first synthesized signal, namely, signal x'[n] corresponding to frame F3 and frame F4 affected by the loss of MDCT4.

It is assumed that signals in the pitch buffer are $p_0[x]$, $x=0, \ldots, T_0-1$. The signals are synthesized according to formula (6) to obtain x'[n]:

$$x'[n]=p_0[n\%T_0], n=0, 1, 2, \ldots, 2N-1 \tag{6}$$

In the formula above, N is a non-negative integer representing the frame length.

Meanwhile, phase $d_{offset}$ is initialized to 0. Therefore, after the two frames corresponding to the first lost MDCT coefficient are synthesized, the phase is updated according to formula (7):

$$d_{offset}=2N\%T_0 \tag{7}$$

If MDCT coefficients are lost continuously, formula (8) is used repeatedly to synthesize the signal x'[n] of the lost frame:

$$x'[n]=p_0[(n+d_{offset})\%T_0], n=0, 1, 2, \ldots, N-1 \tag{8}$$

After the synthesized signal x'[n] corresponding to the lost frame is generated, phase $d_{offset}$ is updated according to formula (9):

$$d_{offset}=(d_{offset}+N)\%T_0, \tag{9}$$

In the formula above, N represents frame length, and $d_{offset}$ represents phase.

In this embodiment, the block of the history signals before lost frames that correspond to the MDCT coefficient being used to generate the first synthesized signal further includes:

using at least one MDCT coefficient after the lost frame to correct the first synthesized signal, namely, using a complete signal received after the lost frame to generate x'[n] that is of better quality. Given below are two exemplary embodiments.

Embodiment 1

Figure 8:
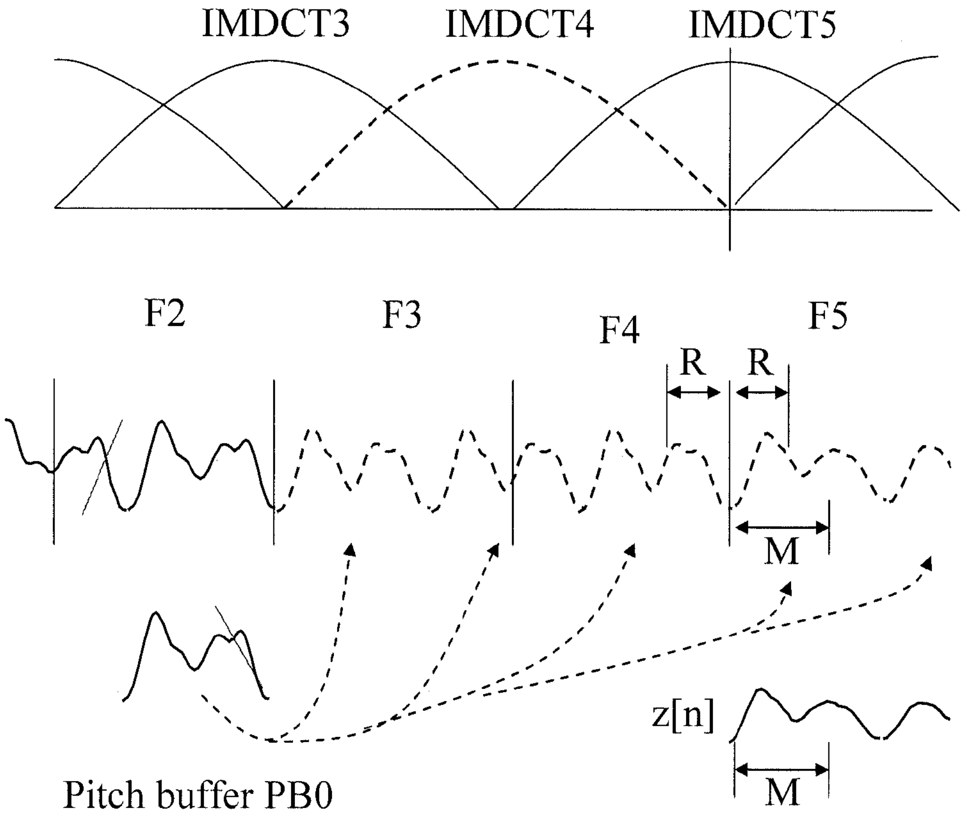
FIG. 8 shows how to generate a first synthesized signal based on pitch repetition in an embodiment of the present invention.

Only one MDCT coefficient after the lost frame is used to correct the first synthesized signal:

First, signals x'[n], n=0, . . . , 3N−1 corresponding to frame F3, frame F4, and frame F5 are synthesized according to block S1 shown in FIG. 6, and then x'[n] is performed phase synchronization, as shown in FIG. 8. Only one MDCT coefficient is available, and the signal corresponding to the IMDCT coefficient is an impaired signal in contrast to the original signal. However, according to the features of a windowed function, a finite number of samples near the joint of frame F4 and frame F5 have amplitude that is approximate to that of the original signal. Therefore, the finite number of samples may be used to perform phase synchronization for the synthesized signal, as detailed below:

The start sample of the IMDCT coefficient corresponding to frame F5 is regarded as a midpoint, $M_{fp}$ samples before the midpoint and $M_{fp}$ samples after the midpoint are used as fixed template window to match waveform with signal x'[n], and formula (10) is applied to obtain a phase difference $d_{fp}$:

$$d_{fp} = \arg\left(\min_{i=-R_{fp},\ldots,R_{fp}}\left(\sum_{j=-M_{fp}}^{M_{fp}} |x'[2N+j+i] - y'[N+j]|\right)\right) \tag{10}$$

Wherein, $[-R_{fp}, R_{fp}]$ is a tolerable range of phase difference. At a sample rate of 8 KHZ, the recommended $R_{fp}$ is $R_{fp}=3$; and y'[n], n=0, . . . , 2N−1 is an impaired signal obtained after the IMDCT5 coefficient Y[n], n=0, . . . , 2N−1 is windowed according to formula (11):

$$y'[n]=h[n]\cdot Y[n], n=0, \ldots, 2N-1; \tag{11}$$

$M_{fp}$, may have different lengths, depending on the difference of the window. For example, when the window h[n] applied in MDCT and IMDCT is a sine window, $M_{fp}$ may be N/4.

Afterward, the synthesized signal is adjusted according to formula (12) to obtain the second synthesized signal x"[n], n=0, . . . , 2N−1:

$$x''[n] = \begin{cases} x'[n+d_{fp}] & d_{fp} >= 0, n = 0, \ldots, 2N-1 \\ \begin{cases} x'[n-d_{fp}] & n >= |d_{fp}| \\ 0 & n < |d_{fp}| \end{cases} & d_{fp} < 0, n = 0, \ldots, 2N-1 \end{cases} \tag{12}$$

Finally, x'[n] and x"[n] are cross-attenuated according to the following formula, and the cross-attenuated signal replaces x'[n]:

$$x'[n] = \frac{2N-n}{2N+1} \cdot x'[n] + \frac{n}{2N+1} \cdot x''[n] \quad n = 0, \ldots, 2N-1 \tag{13}$$

In Embodiment 1, a finite number of samples are used to match the phase. If multiple MDCT coefficients are available after the lost frame, the decoded complete signal may be used to match the phase.

Embodiment 2

Multiple continuous MDCT coefficients after the lost frame are used to correct the first synthesized signal:

2.1 Only Phase Synchronization is Performed.

Figure 9:
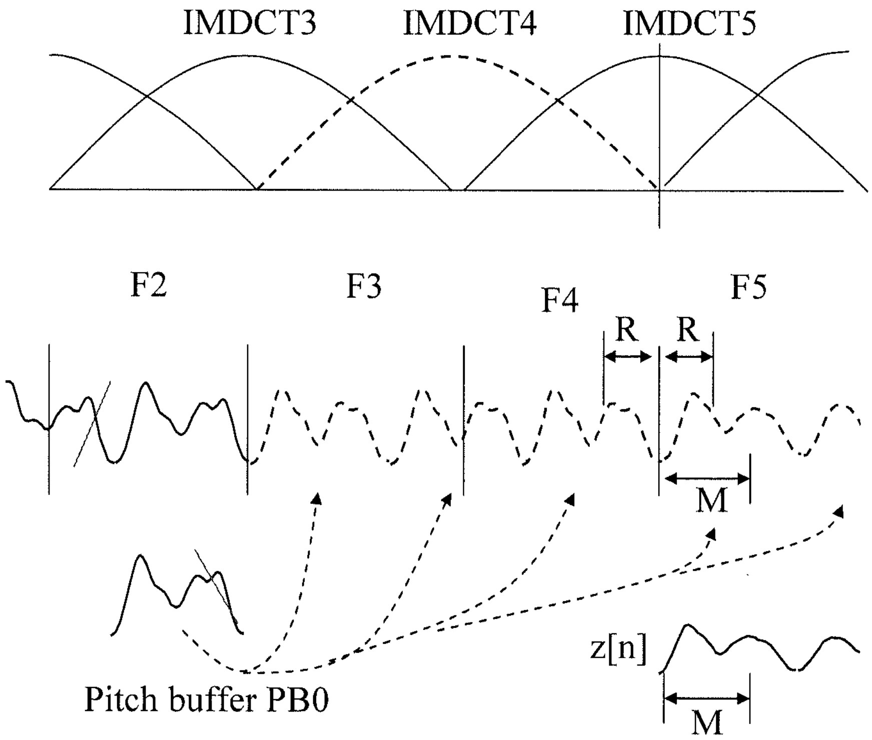
FIG. 9 shows how to generate a first synthesized signal based on pitch repetition in an embodiment of the present invention.

Taking FIG. 9 as an example, this method is elaborated below. It is assumed that z[n], n=0, . . . , L−1 are complete signals after the lost frame, and L is the number of complete samples available after the lost frame. As shown in FIG. 9, z[n], n=0, . . . , L−1 correspond to frame F5 and frames after F5.

First, the signals x'[n], n=0, . . . , 3N−1 corresponding to frames F3, F4, and F5 are synthesized according to block S1 in FIG. 6. Afterward, z[n] is used to perform phase matching for x'[n] and the corresponding phase difference $d_{bp}$ is obtained. Specifically, The begin $M_{bp}$ length of z[n] is regarded as a signal template, and then the phase difference $d_{bp}$ is obtained near the sample point x'[2N] in x'[n] according to formula (14):

$$d_{bp} = \arg\left(\min_{i=-R_{bp},\ldots,R_{bp}}\left(\sum_{j=0}^{M_{bp}-1} |x'[2N+j+i] - z[j]|\right)\right) \tag{14}$$

Wherein, $[-R_{bp}, R_{bp}]$ is a tolerable range of phase difference. At a sample rate of 8 KHZ, the recommended $R_{bp}$ is $R_{bp}=3$.

After the phase difference $d_{bp}$ is obtained, formula (15) is applied to obtain the second synthesized signal x"[n], n=0, . . . , 2N−1:

$$x''[n] = \begin{cases} x'[n+d_{bp}] & d_{bp} >= 0, n = 0, \ldots, 2N-1 \\ \begin{cases} x'[n-d_{bp}] & n >= |d_{bp}| \\ 0 & n < |d_{bp}| \end{cases} & d_{bp} < 0, n = 0, \ldots, 2N-1 \end{cases} \tag{15}$$

Finally, the first synthesized signal x'[n] and the second synthesized signal x"[n] are cross-attenuated according to formula (13), and the cross-attenuated signal replaces x'[n].

2.2 Only Backward Aliasing is Performed.

In the case of long frames, the pitch period $T_1$ of the signals of the current frame z[n], n=0, . . . , L−1 may be obtained through the prior art such as autocorrelation.

In the case of short frames, the decoded signals z[n] are not enough for obtaining the pitch period $T_1$ of the signals corresponding to the current frame. Considering that the pitch period of the signals corresponding to the lost frame does not change sharply in the case of short frames, the pitch period $T_0$ of the history signals may be used as an initial value of the pitch period $T_1$ corresponding to the current frame, and then $T_1$ is fine-tuned to obtain a specific value of $T_1$, as detailed below:

First, $T_1$, is initialized to pitch period $T_0$, namely, $T_1=T_0$, and then an Average Magnitude Difference Function (AMDF) is applied to fine-tune $T_1$ and obtain a more accurate $T_1$. More specifically, formula (16) is applied to fine-tune $T_1$:

$$T_1 = T_0 + \arg\left(\min_{i=-R_{T_1},\ldots,R_{T_1}}\left(\sum_{j=0}^{M_{T_1}-1} |z[j] - z[j+T_0+i]|\right)\right) \tag{16}$$

In the formula above, $R_{T_1}$ is a set range of adjusting $T_1$. At a sample rate of 8 KHZ, $R_{T_1}=3$ is recommended.

$M_{T_1}$ is the length of the corresponding window at the time of using AMDF. In this embodiment, it is recommended that:

$$M_{T_1}=\min(T_0*0.55, L-T_0) \tag{17}$$

z[n] is the complete signal received after the affected frame, and L is the number of available samples after the lost frame.

After $T_1$ is obtained, the begin $T_1$ samples of z[n] are copied to the pitch buffer $PB_1$, and $PB_1$ is initialized. The signals in $PB_1$ are expressed by $p_1[n]$, n=0, . . . , $T_1-1$, and formula (18) is used to express the process of initializing $PB_1$ as follows:

$$p_1[n]=z[n]\, n=0, \ldots, T_1-1 \tag{18}$$

Figure 10:
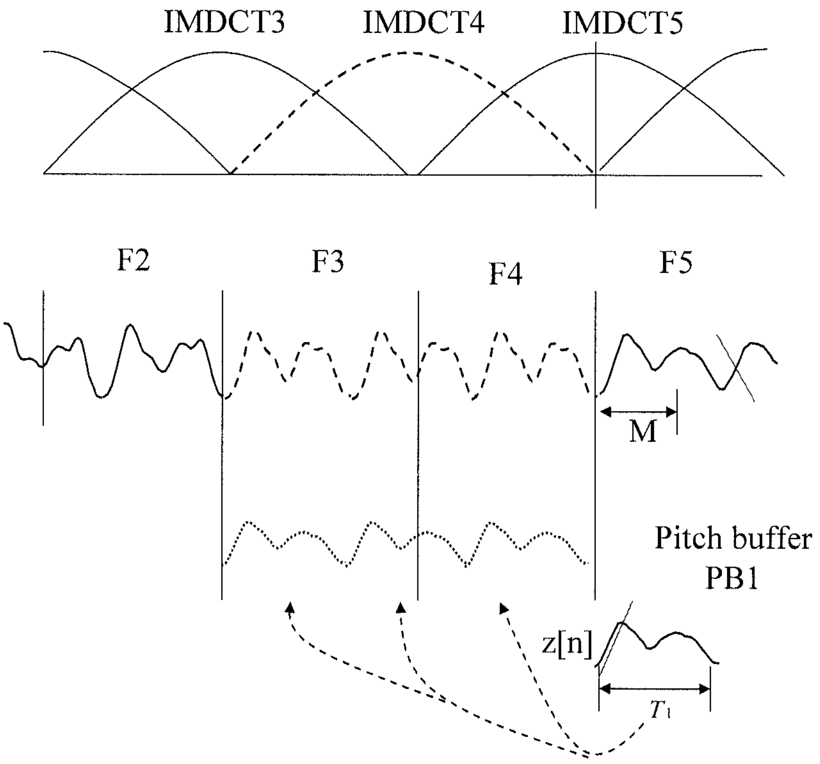
FIG. 10 shows how to generate a first synthesized signal based on pitch repetition in an embodiment of the present invention.

After $PB_1$ is initialized, backward pitch period repetition is used to generate the second synthesized signal x"[n], n=0, . . . , 2N−1, as detailed below:

As shown in FIG. 10, frame F2 is the last complete frame before lost frame F3 and lost frame F4. Frame F3 and frame F4 are frames affected by loss of the MDCT coefficient, and frame F5 is the complete frame decoded by the decoder. In the waveform diagram in FIG. 10, the signal corresponding to the upper dashed line is the signal x'[n] generated according to the history signals, and the signal corresponding to the lower dashed line is the signal x"[n] generated according to the complete signal after the affected frame. To prevent waveform mutation of the voice filled through backward pitch period repetition from occurring at the joint of two pitch periods, frame F5 needs to be smoothened before the voice is filled through backward pitch period repetition. The method of smoothening frame F5 is as follows:

The samples of begin $T_1/4$ length signal of z[n] are multiplied by a rising triangular window one by one to obtain a first multiplied signal. The begin $T_1/4$ length signal of a pitch period length of z[n] is multiplied by a falling triangular window one by one to obtain a second multiplied signal. Cross attenuation is performed on the first multiplied signal and the second multiplied signal, and the cross-attenuated signals are substituted for the begin $T_1/4$ length signal of the pitch buffer $PB_1$. The smoothened frame is expressed by formula (19) as follows:

$$p_1[n] = \frac{T_1/4-n}{T_1/4+1} * z[T_1+n] + \frac{n}{T_1/4+1} * z[n] \quad n = 0, \ldots, T_1/4-1 \tag{19}$$

After frame F5 is smoothened, the signal x"[n] is generated by using a pitch repetition method, by using the begin $T_1$ sample signals of the pitch buffer $PB_1$. The signal x"[n] is represented by three arrows in FIG. 10, and is expressed by formula (20) as follows:

$$x''[n]=p_1[((T_1-2N\%T_1)+n)\%T_1], n=0, \ldots, 2N-1 \tag{20}$$

Finally, x"[n] and x'[n] are cross-attenuated, and the cross-attenuated signal replaces x'[n] according to formula (13).

In the case that the number of samples available (L) after the lost frame is not enough for fulfilling the smoothening conditions, namely, $T_1$*1.25<L, only phase synchronization is performed for the synthesized signal according to the method described in 2.1 above.

Block S1 is described above with reference to FIG. 6-FIG. 10 in detail. Fast IMDCT in an embodiment of the present invention based on the signal x'[n] obtained above is described following. Specifically, in block S2, according to the nature of MDCT and IMDCT coefficients, the following formula may be used to obtain the IMDCT coefficient corresponding to the lost frame quickly:

$$Y[n]=\begin{cases} h[n]\cdot x'[n]-h[N-n-1]\cdot x'[N-n-1] & n=0,\ldots,N-1 \\ h[n]\cdot x'[n]+h[3N-n-1]\cdot x'[3N-n-1] & n=N,\ldots,2N-1 \end{cases} \tag{21}$$

In the formula above, Y[n] represents the IMDCT coefficient corresponding to the lost MDCT coefficient, x'[n] represents the first synthesized signal, and N is the frame length.

In practice, in block S3, the IMDCT coefficient corresponding to the lost MDCT coefficient and an IMDCT coefficient adjacent to the IMDCT coefficient corresponding to the lost MDCT coefficient are used to perform TDAC and signals corresponding to the lost frame are obtained includes:

performing aliasing according to formula (5) to obtain the signals corresponding to the lost frame.

In formula (5), y[n] represents the signal corresponding to a lost frame that corresponds to the lost MDCT coefficient, h[n] represents the window function for TDAC processing, Y[n] represents the IMDCT coefficient corresponding to the lost MDCT coefficient, and therefore, Y'[n+N] represents the IMDCT coefficient adjacent to and prior to Y[n].

In this embodiment, the first N coefficients of IMDCT4 that are obtained in block S2 are aliased with the last N coefficients of IMDCT3 to obtain the signal $y_1[n]$ corresponding to frame F3:

$$y_1[n]=h[n+N]\cdot Y_1'[n+N]+h[n]\cdot Y_1[n]\quad n=0,\ldots,N-1,$$

$$Y_1[n]=h[n]\cdot x'[n]-h[N-n-1]\cdot x'[N-n-1]\quad n=0,\ldots,N-1;$$

In the formulas above, $Y_1[n]$ represents the IMDCT coefficient corresponding to frame F3 (namely, the first N coefficients of IMDCT4), and $Y_1'[n+N]$ represents the IMDCT coefficient corresponding to frame F2 (namely, the last N coefficients of IMDCT3), where N represents the frame length.

The last N coefficients of IMDCT4 that are obtained in block S2 are aliased with the first N coefficients of IMDCT5 to obtain the signal $Y_2[n]$ of frame F4:

$$y_2[n]=h[n+N]\cdot Y_2'[n+N]+h[n]\cdot Y_2[n]\quad n=N,\ldots,2N-1,$$

$$Y_2[n]=h[n]\cdot x'[n]-h[3N-n-1]\cdot x'[3N-n-1]\quad n=N,\ldots,2N-1.$$

In the formulas above, $Y_2[n]$ represents the IMDCT coefficient corresponding to frame F4 (namely, the last N coefficients of IMDCT4), and $Y_2'[n+N]$ represents the IMDCT coefficient corresponding to frame F5 (namely, the first N coefficients of IMDCT5), where N represents the frame length.

The method for concealing lost frames described above uses partial signals of the lost frame and the complete signals after the lost frame to recover the signals of the lost frame, thus making full use of the signal resources, improving the user experience and ensuring QoS.

Figure 11:
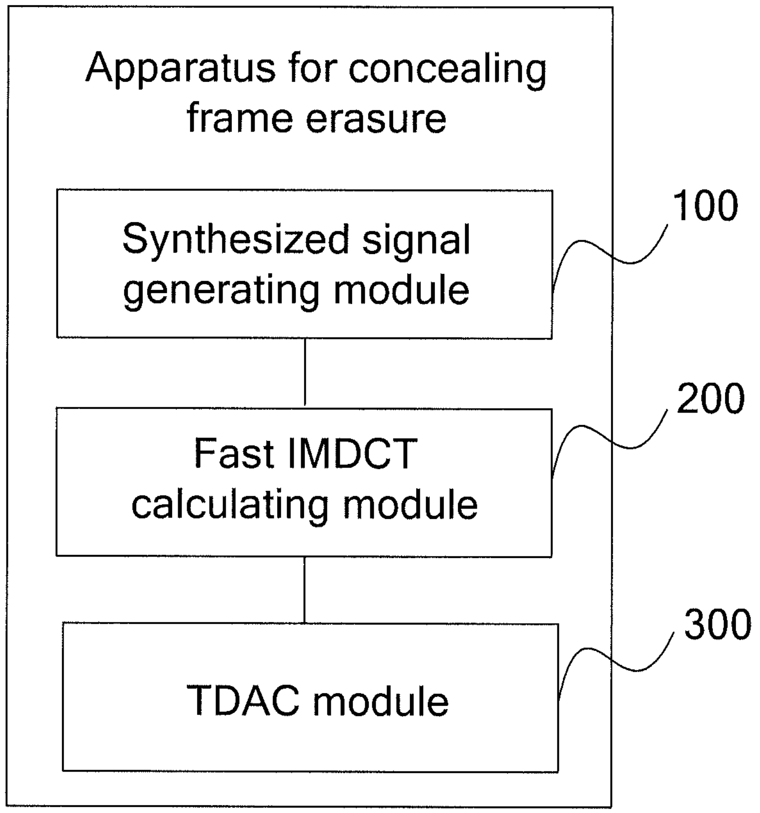
FIG. 11 shows a structure of an apparatus for concealing lost frame in an embodiment of the present invention.
Figure 12:
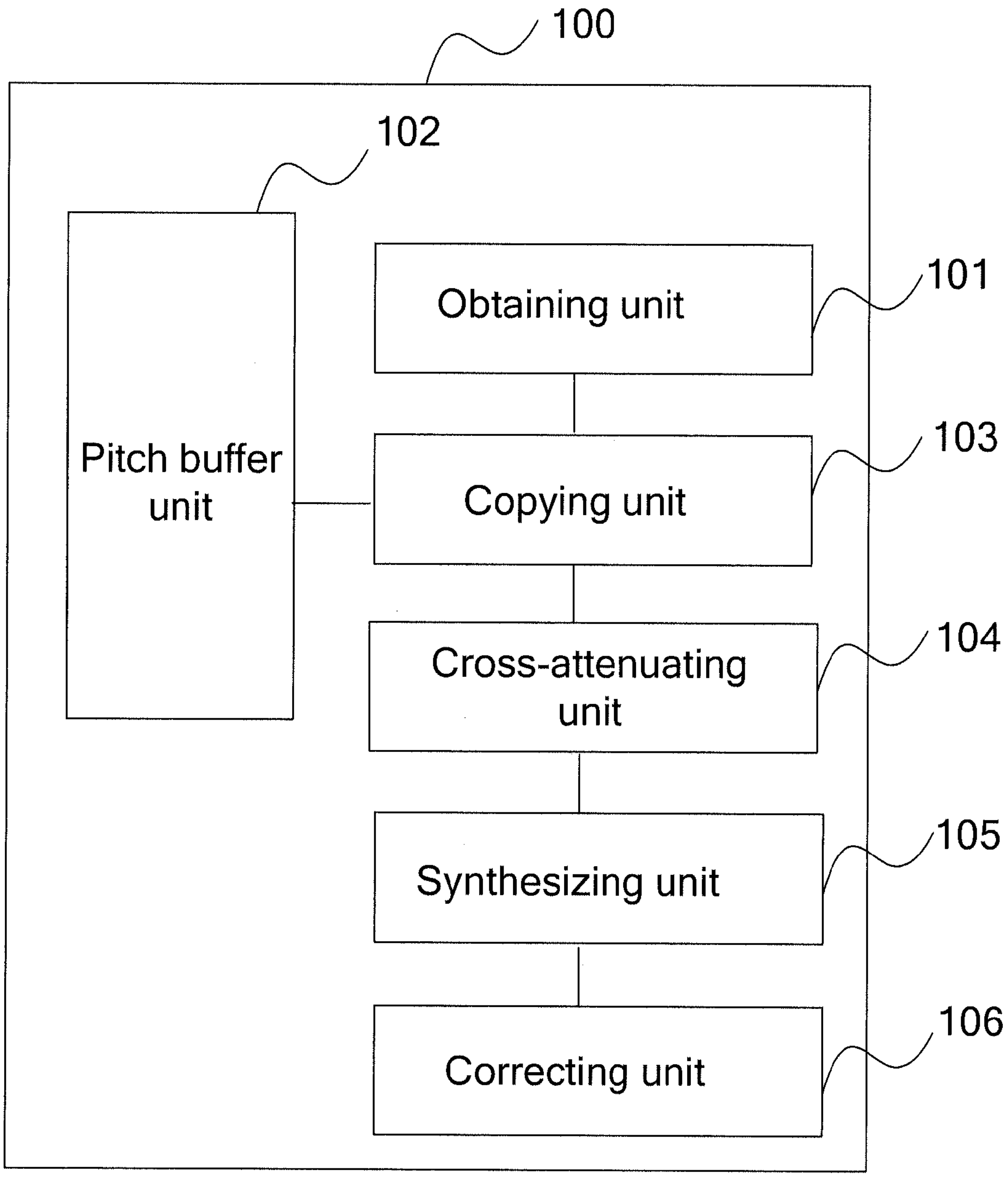
FIG. 12 shows a structure of a synthesized signal generating module illustrated in FIG. 11.

The following elaborates an apparatus for concealing lost frame in an embodiment of the present invention by reference to FIG. 11 and FIG. 12.

As shown in FIG. 11, an apparatus for concealing lost frame includes:

a synthesized signal generating module 100, configured to use history signals before the lost frame that corresponds to the lost MDCT coefficient to generate a first synthesized signal when it is detected that the MDCT coefficient is lost;

a fast IMDCT calculating module 200, configured to use a fast IMDCT algorithm to perform fast IMDCT for the first synthesized signal to obtain an IMDCT coefficient corresponding to the lost MDCT coefficient; and a TDAC module 300, configured to use the IMDCT coefficient corresponding to the lost MDCT coefficient and an IMDCT coefficient adjacent to the IMDCT coefficient corresponding to the lost MDCT coefficient to perform TDAC and obtain signals corresponding to the lost frame.

In practice, as shown in FIG. 12, the synthesized signal generating module 100 includes:

an obtaining unit 101, configured to obtain history signals existing before the lost frame and the pitch period corresponding to the history signals;

a copying unit 102, configured to copy the last pitch period length signal of the history signals obtained by the obtaining unit 101 to a pitch buffer;

a pitch buffer unit 103, configured to buffer the pitch period length signal that are copied by the copying unit 102;

a cross-attenuating unit 104, configured to: multiply the signals that begin at the last $5T_0/4$ of the history signals and whose length is $T_0/4$ by a rising window to obtain a first multiplied signal, multiply the signals that begin at $3T_0/4$ in the pitch buffer and whose length is $T_0/4$ by a falling window to obtain a second multiplied signal, perform cross attenuation on the first multiplied signal and the second multiplied signal, and substitute the cross-attenuated signals for the signals that begin at $3T_0/4$ in the pitch buffer and whose length is $T_0/4$, where $T_0$ represents the pitch period; and a synthesizing unit 105, configured to generate the first synthesized signal by using a pitch repetition method according to the signals whose length is $T_0$ in the pitch buffer.

Wherein, the first synthesized signal is:

$$x'[n]=p_0[n\%T_0],\ n=0,1,2,\ldots,2N-1$$

In the formula above, $p_0[x]$, x=0, . . . , $T_0-1$ represents the signal in the pitch buffer, $T_0$ represents the pitch period, and N represents the frame length.

When continuous loss of MDCT coefficients is detected, the first synthesized signal is:

$$x'[n]=p_0[(n+d_{offset})\%T_0],\ n=0,1,2,\ldots,N-1,$$

$$d_{offset}=(d_{offset}+N)\%T_0$$

In the formulas above, $T_0$ represents the pitch period, N represents the frame length, and $d_{offset}$ represents the phase, whose initial value is 0.

In practice, the synthesized signal generating module 100 includes:

a correcting unit 106, configured to: use at least one MDCT coefficient after the lost frame to correct the first synthesized signal generated by the synthesizing unit 105, which includes: use only one MDCT coefficient after the lost frame to perform correction, or use multiple continuous MDCT coefficients after the lost frame to perform correction, which has been elaborated above with reference to FIG. 8-FIG. 10.

In practice, the fast IMDCT calculating module 200 uses a fast IMDCT algorithm to perform fast IMDCT for the first synthesized signal to obtain the IMDCT coefficient corresponding to the lost MDCT coefficient in the following way:

$$Y[n] = \begin{cases} h[n]\cdot x'[n] - h[N-n-1]\cdot x'[N-n-1] & n = 0, \dots, N-1 \\ h[n]\cdot x'[n] + h[3N-n-1]\cdot x'[3N-n-1] & n = N, \dots, 2N-1 \end{cases}$$

x'[n] represents the first synthesized signal, and N is the frame length.

In practice, the TDAC module 300 uses the IMDCT coefficient corresponding to the lost MDCT coefficient and the IMDCT coefficients adjacent to the IMDCT coefficient corresponding to the lost MDCT coefficient to perform TDAC and obtain signals corresponding to the lost frame that corresponds to the lost MDCT coefficient in the following way:

$$y[n]=h[n+N]\cdot Y'[n+N]+h[n]\cdot Y[n]n=0, \dots, N-1$$

In the formula above, h[n] represents the window function for TDAC processing, Y[n] represents the IMDCT coefficient corresponding to the lost MDCT coefficient, and therefore, Y'[n+N] represents the previous IMDCT coefficient adjacent to Y[n].

Persons of ordinary skill in the art should understand that the method for concealing lost frame in an embodiment of the present invention may be implemented through computer programs, instructions, or programmable logical components, and the programs may be stored in a storage medium such as CD-ROM and magnetic disk.

The method and the apparatus for concealing lost frame in the embodiments of the present invention described above use a low complexity fast algorithm to obtain the IMDCT coefficient of the synthesized signal in the aliasing mode according to the MDCT nature, make full use of the received partial signals to recover high-quality voice signals and improve the QoS.

It should be noted that the above descriptions are merely preferred embodiments of the present invention, and those skilled in the art may make various improvements and refinements without departing from the principle of the invention. All such modifications and refinements are intended to be covered by the present invention.

What is claimed is:

1. A method for concealing a lost frame, comprising:

using history signals before the lost frame that corresponds to a lost Modified Discrete Cosine Transform (MDCT) coefficient to generate a first synthesized signal x'[n] when it is detected that the MDCT coefficient is lost;

performing fast Inverse Modified Discrete Cosine Transform (IMDCT) for the first synthesized signal to obtain an IMDCT coefficient corresponding to a lost MDCT coefficient; and using the IMDCT coefficient corresponding to the lost MDCT coefficient and an IMDCT coefficient adjacent to the IMDCT coefficient corresponding to the lost MDCT coefficient to perform Time Domain Aliasing Cancellation (TDAC) and obtain signals corresponding to the lost frame;

wherein the using the history signals before the lost frame that corresponds to the lost MDCT coefficient to generate the first synthesized signal comprises:

obtaining the history signals that exist before the lost frame and a pitch period corresponding to the history signals;

copying a last $T_0$ length signal of the history signals to a pitch buffer, wherein $T_0$ represents the pitch period;

multiplying signals that begin at the last $5T_0/4$ of the history signals and whose length is $T_0/4$ by a rising window to obtain a first multiplied signal, multiplying signals that begin at $3T_0/4$ in the pitch buffer and whose length is $T_0/4$ by a falling window to obtain a second multiplied signal, performing cross attenuation on the first multiplied signal and the second multiplied signal, and substituting the cross-attenuated signals for signals that begin at $3T_0/4$ in the pitch buffer and extending a length of $T_0/4$; and generating the first synthesized signal by using a pitch repetition method according to the signals whose length is $T_0$ in the pitch buffer;

wherein the using the history signals before the lost frame that corresponds to the MDCT coefficient to generate the first synthesized signal further comprises:

using at least one MDCT coefficient after the lost frame to correct the first synthesized signal;

wherein the using at least one MDCT coefficient after the lost frame to correct the first synthesized signal comprises:

regarding the start sample of the IMDCT coefficient corresponding to the frame after the lost frame as a midpoint;

using $M_{fp}$ samples before the midpoint and $M_{fp}$ samples after the midpoint as fixed template window to match waveform with the first synthesized signal x'[n];

obtaining a phase difference $d_{fp}$ according to the formula $$d_{fp} = \arg\min_{i=-R_{fp},\dots,R_{fp}}\left(\left(\sum_{j=-M_{fp}}^{M_{fp}} |x'[2N+j+i] - y'[N+j]|\right)\right),$$

wherein N is number of samples in a frame, $[-R_{fp}, R_{fp}]$ is a tolerable range of phase difference, and y'[n], n=0, . . . , 2N−1 is an impaired signal obtained after the IMDCT coefficient Y[n], n=0, . . . , 2N−1 is windowed according to the formula y'[n]=h[n]·Y[n], n=0, . . . , 2N−1, wherein h[n] is a sine window;

adjusting the first synthesized signal x'[n] to obtain the second synthesized signal x"[n], n=0, . . . , 2N−1 according to the formula:

$$x''[n] = \begin{cases} x'[n+d_{fp}] & d_{fp} >= 0, n = 0, \dots, 2N-1 \\ \begin{cases} x'[n-d_{fp}] & n >= |d_{fp}| \\ 0 & n < |d_{fp}| \end{cases} & d_{fp} < 0, n = 0, \dots, 2N-1; \end{cases}$$

and performing cross-attenuation on the first synthesized signal x'[n] and the second and synthesized signal x"[n] according to the formula:

$$x'[n] = \frac{2N-n}{2N+1}\cdot x'[n] + \frac{n}{2N+1}\cdot x''[n] \quad n = 0, \dots, 2N-1,$$

and replacing the first synthesized signal x'[n] by the cross-attenuated signal.

2. A method for concealing a lost frame, comprising:

using history signals before the lost frame that corresponds to a lost Modified Discrete Cosine Transform (MDCT)

coefficient to generate a first synthesized x'[n] signal when it is detected that the MDCT coefficient is lost;

performing fast Inverse Modified Discrete Cosine Transform (IMDCT) for the first synthesized signal to obtain an IMDCT coefficient corresponding to a lost MDCT coefficient; and using the IMDCT coefficient corresponding to the lost MDCT coefficient and an IMDCT coefficient adjacent to the IMDCT coefficient corresponding to the lost MDCT coefficient to perform Time Domain Aliasing Cancellation (TDAC) and obtain signals corresponding to the lost frame;

wherein the using the history signals before the lost frame that corresponds to the lost MDCT coefficient to generate the first synthesized signal comprises:

obtaining the history signals that exist before the lost frame and a pitch period corresponding to the history signals;

copying a last $T_0$ length signal of the history signals to a pitch buffer, wherein $T_0$ represents the pitch period;

multiplying signals that begin at the last $5T_0/4$ of the history signals and whose length is $T_0/4$ by a rising window to obtain a first multiplied signal, multiplying signals that begin at $3T_0/4$ in the pitch buffer and whose length is $T_0/4$ by a falling window to obtain a second multiplied signal, performing cross attenuation on the first multiplied signal and the second multiplied signal, and substituting the cross-attenuated signals for signals that begin at $3T_0/4$ in the pitch buffer and extending a length of $T_0/4$; and generating the first synthesized signal by using a pitch repetition method according to the signals whose length is $T_0$ in the pitch buffer;

wherein the using the history signals before the lost frame that corresponds to the MDCT coefficient to generate the first synthesized signal further comprises:

using at least one MDCT coefficient after the lost frame to correct the first synthesized signal;

wherein the using at least one MDCT coefficient after the lost frame to correct the first synthesized signal comprises:

regarding the begin $M_{bp}$ length of z[n] as a signal template, wherein z[n], n=0, . . . , L−1 are complete signals after the lost frame, and L is number of complete samples available after the lost frame;

obtaining he phase difference $d_{bp}$ near the sample point x'[2N] in according to the formula:

$$d_{bp} = \arg\left(\min_{i=-R_{bp},\dots,R_{bp}}\left(\sum_{j=0}^{M_{bp}-1} |x'[2N+j+i] - z[j]|\right)\right),$$

wherein N is number of samples in a frame, $[-R_{bp}, R_{bp}]$ is a tolerable range of phase difference;

obtaining a second synthesized signal y'[n], n=0, . . . , 2N−1 according to the formula:

$$x''[n] = \begin{cases} x'[n+d_{bp}] & d_{bp} >= 0,\ n = 0, \dots, 2N-1 \\ \begin{cases} x'[n-d_{bp}] & n >= |d_{bp}| \\ 0 & n < |d_{bp}| \end{cases} & d_{bp} < 0,\ n = 0, \dots, 2N-1, \end{cases}$$

after the phase difference $d_{bp}$ is obtained; and performing cross-attenuation on the first synthesized signal x'[n] and the second synthesized signal x"[n] according to the formula:

$$x'[n] = \frac{2N-n}{2N+1}\cdot x'[n] + \frac{n}{2N+1}\cdot x''[n] \quad n = 0, \dots, 2N-1,$$

and replacing the first synthesized x'[n] signal by the cross-attenuated signal.

* * * * *

UNITED STATES PATENT AND TRADEMARK OFFICE

CERTIFICATE OF CORRECTION

PATENT NO. : 8,457,115 B2
APPLICATION NO. : 12/913245
DATED : June 4, 2013
INVENTOR(S) : Wuzhou Zhan et al.

It is certified that error appears in the above-identified patent and that said Letters Patent is hereby corrected as shown below:

In the Claims

Column 14, Line 1, In Claim 2, delete “begin” and insert -- beginning --, therefor.

Column 14, Line 5, In Claim 2, after “obtaining”, delete “he” and insert -- the --, therefor.

Column 14, Line 6, In Claim 2, after “x'(2N]” insert -- in $x'[n]$ --.

Column 14, Line 17 (Approximately), In Claim 2, delete “y'[n],n=0,...,2N-1” and insert --$x''[n],n=0,...,2N-1$ --, therefor.

Signed and Sealed this
Twenty-fourth Day of March, 2015

Michelle K. Lee

Michelle K. Lee
*Director of the United States Patent and Trademark Office*